US006287708B1

(12) United States Patent
Viikari et al.

(10) Patent No.: US 6,287,708 B1
(45) Date of Patent: Sep. 11, 2001

(54) ADHESIVE FOR FIBER BOARDS

(75) Inventors: Liisa Viikari, Helsinki; Anneli Hase; Pia Qvintus-Leino, both of Espoo; Kirsi Kataja, Helsinki; Simo Tuominen, Huuvari; Lars Gädda, Porvoo, all of (FI)

(73) Assignee: Neste Chemicals Oy, Espoo (FI)

( * ) Notice: Subject to any disclaimer, the term of this patent is extended or adjusted under 35 U.S.C. 154(b) by 0 days.

(21) Appl. No.: 09/341,579

(22) PCT Filed: Jan. 14, 1998

(86) PCT No.: PCT/FI98/00024

§ 371 Date: Nov. 9, 1999

§ 102(e) Date: Nov. 9, 1999

(87) PCT Pub. No.: WO98/31762

PCT Pub. Date: Jul. 23, 1998

(30) Foreign Application Priority Data

Jan. 14, 1997 (FI) .......................................... 970158

(51) Int. Cl.$^7$ ............................... B32B 3/26; C08G 63/00
(52) U.S. Cl. ......................... 428/535; 527/400; 527/403; 530/500; 524/73; 524/74
(58) Field of Search .................................. 527/400, 403; 530/500; 428/535; 524/73.74

(56) References Cited

U.S. PATENT DOCUMENTS 4,432,921  2/1984  Haars et al. .
5,846,788 * 12/1998 Pedersen et al. .................... 435/101

FOREIGN PATENT DOCUMENTS

| 3621218 | 1/1988 | (DE) . |
| 3933279C1 | 7/1990 | (DE) . |
| 4020969C1 | 7/1991 | (DE) . |
| 4204793C1 | 4/1993 | (DE) . |
| 4306439C1 | 8/1994 | (DE) . |
| 0418201A2 | 3/1991 | (EP) . |
| 0565109A1 | 10/1993 | (EP) . |
| 900544 | 10/1991 | (FI) . |
| 935067 | 12/1993 | (FI) . |
| 94261 | 4/1995 | (FI) . |
| WO 91/11552A1 | 8/1991 | (WO) . |
| WO 92/20857A1 | 11/1992 | (WO) . |
| WO 93/23477A1 | 11/1993 | (WO) . |
| WO 94/01488A1 | 1/1994 | (WO) . |
| WO9523232 | 8/1995 | (WO) . |
| WO9603546 | 2/1996 | (WO) . |

OTHER PUBLICATIONS

Abstract of German Patent 3621218, Haars et al. "Binder prepn for wood– or cellulose– contg material by reacting lignin– . . . ".

Abstract of German Patent 3933279, Huettermann et al. "Moulded article e.g. chipboard with improved wet strength . . . ".

Abstract of German Patent 4020969, Huttermann et al. "Moulding with improved mechanical properties and density—comprises . . . ".

Abstract of German Patent 4204793, Huettermann et al. "Binding inorganic material for forming heat or sound insulation . . . ".

Abstract of German Patent 4306439, Huettermann et al. "Fibreboard sheets based on wood or cellulose fibres . . . ".

Abstract of EPO Patent 565109, Huettermann "Bonding of wood fragments without binder—after lignin activation with . . . ".

Abstract of Finnish Patent 900544, Ruohoniemi "Enzyme treatment of woody material—to reduce specific . . . ".

Abstract of Finnish Patent 935067, Call "Using laccase from Coriolus versicolor—for delignifying or bleaching . . . ".

* cited by examiner

Primary Examiner—Samuel A. Acquah
(74) Attorney, Agent, or Firm—Birch, Stewart Kolasch & Birch, LLP

(57) ABSTRACT

An adhesive binder for bonding together lignocellulosic particles, fibers and flakes of vegetable origin to form particle boards, fiber boards, flake boards and similar wood-based products, comprising a solublized fraction obtained by enzymatic treatment of fibrous, lignocellulosic raw materials. The present binder can be obtained by treating fibrous lignocellulosic raw material with a hydrolytic enzyme in an aqueous medium, recovering the solubilized material of the enzymatic treatment, forming an aqueous suspension containing said material and an oxidase, and oxidizing said material in the presence of said oxidase by introducing oxygen-containing gas into the supension. This method thus produces an increased amount of a water-soluble fraction containing carbohydrates, extractives and lignin useful as an adhesive binder.

21 Claims, No Drawings

ADHESIVE FOR FIBER BOARDS

This application is the national phase under 35 U.S.C. §371 of PCT International Application No. PCT/FI98/00024 which has an International filing date of Jan. 14, 1998, which designated the United States of America.

The present invention relates to the manufacture of fiber boards, in particular of medium density fiber boards, which comprise fibrous lignocellulosic particles mixed with and bonded together with an adhesive binder. In particular, the present invention concerns novel adhesives binders and a preparation process thereof as well as fiber boards manufactured using the adhesive.

The rapid increase in the production of particle boards, flake boards and fiber boards, in particular medium density fiber boards and especially MDF board production during the last decades demands an adhesive that is cheap, available in large quantities, and independent of crude oil. Lignin meets well these demands, and it does not contain formaldehyde, which traditionally has been considered a serious problem with ureaformaldehyde (UF) adhesives. As a major wood component, native lignin is neither hygroscopic nor soluble in water. However, during pulping, lignin becomes soluble in water, due to degradation and chemical changes.

According to its structure as a polyphenol, lignin as an adhesive should be similar to phenol-formaldehyde (PF) resins. This is true for native lignin in wood, while technical lignins (lignosulpbonate or kraft lignin) have been shown to have serious limitations due to their low reactivity (kraft lignin) or due to their high hygroscopicity (lignosulphonates).

The use of spent sulphite liquor (SSL) as an adhesive for paper, wood and other lignocellulosic materials is well-known in the art, and a large number of patent applications has been filed during the last three decades for the use of lignin products as adhesives for particle board, plywood and fiber board instead of conventional PF or UF adhesives. Reference is made to DE Pat. Nos. 3,037,992, 3,621,218, 3,933,279, 4,020,969, 4,204,793 and 4,306,439 and PCT Applications published under Nos. WO 93/25622, WO 94/01488, WO 95/23232 and WO 96/03546.

The main drawback of using SSL as an adhesive for fiber board manufacture is its hygroscopicity. For this reason it cannot really compete with other natural or synthetic adhesives.

It has been shown that laccase enzymes and other peroxidases can be used as polymerization or curing catalysts of lignin (DE Pat. No. 3,037,992, WO 96/03546). However, the enzymes for creating radical reactions have shown limited success so far. Fibers and wood chips used in the production of fiber boards contain 5–20% water and the laccases used need some water to effectively catalyze the polymerization reaction needed for extensive bonding of the fiberboard. Kraft lignin like native lignin to its major part is, however, insoluble in water and thus two solid phases are formed on the production line. An uneven distribution of the solids causes spotting and major failure in the strength properties of the board formed in the pressing stage.

A further problem relating to the use of isolated lignin is the high price of kraft lignin which is near the limit for economical production of particle boards.

For the above mentioned reasons, lignin-based board production processes have not, so far, led to any major practical applications.

Instead of lignin-based adhesives, it has been suggested to activate the lignin of wood fibers with laccase and to use these fibers as such without any additional binders for manufacturing wood fiber boards (cf. EP Patent Application No. 0 565 109). The main problem relating to said technology is the long incubation time required (up to seven days). Components derived from annual plant materials, such as feruloylarabinoxylans, can also be used as additives for adhesives in particle boards. Thus, according to Feldman et al. (WO 96/03546) wood fibers and chips can be bonded together using oxidized phenolic polysaccharides. These xylans occur only in annual plants, not in softwood or hardwood materials. They are not industrially available.

The present invention aims at eliminating the problems relating to the prior art. In particular it is an object of the present invention to provide a novel carbohydrate/lignin-based adhesive for the preparation of fiber boards and similar wood-based products. It is another object of the present invention to provide new fiber boards and similar wood-based products. It is a third object to provide a method for manufacturing the adhesive.

These and other objects, together with the advantages thereof over known lignin-based adhesives and processes for the preparation thereof, which shall become apparent from the specification which follows, are accomplished by the invention as hereinafter described and claimed.

It is known in the art that during mechanical refining of chips, a part of the compounds of the fibrous raw material is dissolved (about 1% of the fiber weight). This fraction, which primarily contains the same chemical components as the fibers (carbohydrates, extractives and lignin) decontaminates the circulation waters and effluents of paper mills and increase the volumes of waste waters that have to be treated. Different filtration and concentration methods are being employed to separate the dissolved compounds from the process waters. As a result, a concentrated waste fraction without any practical use today is being obtained.

In our copending application is has been shown that this soluble lignin/carbohydrate fraction is particularly useful as an additive or adjuvant for gluing of particles boards, fiber boards and other similar wood-based composite products. Particularly good gluing is achieved if this fraction is polymerized with laccase (or similar oxidase) enzyme(s). The results are on the same level as those obtainable with conventional phenol or urea formaldehyde resins.

In the context of the present invention, we have found that a similar fraction of soluble carbohydrates, extractives and lignin compounds can be obtained by hydrolyzation and peeling of lignocellulosic fibres by using enzymes capable of removing carbohydrate layers from the fibre surfaces. These enzymes comprise hydrolases, i.e. enzymes typically hydrolyzing cellulose, hemicellulose or pectin from the fibres. In addition to carbohydrates, these enzymes also remove lignin-carbohydrate fractions present in the woody materials.

This method thus produces an increased amount of a water-soluble fraction containing carbohydrates, extractives and lignin useful as an adhesive binder. The method can be used also for any other type of raw material derived from plants, and used for limited or extensive hydrolysis.

The invention also concerns a process for preparing an adhesive binder composition, which comprises the steps of
- treating fibrous lignocellulosic raw material with a hydrolytic enzyme in an aqueous medium,
- recovering the solubilized material of the enzymatic treatment,
- forming an aqueous suspension containing said material and an oxidase, and
- oxidizing said material in the presence of said oxidase by introducing oxygen-containing gas into the suspension.

The above process can be carried out by mixing lignocellulosic particles, fibers and flakes of vegetable origin with the solubilized material and the oxidase to form a hardenable composition which can be shaped into particle boards, fiber boards, flake boards or similar wood-based products by oxidizing, and by polymerizing the solubilized material in the presence of said oxidase and oxygen.

The enzymatically obtained fraction can be combined or used together with a (non-enzymatically produced) soluble fraction of mechanical or chemimechanical refining of lignocellulosic raw material.

The invention will now be explained in more detail with the aid of the following detailed description and with reference to a number of working examples.

Within the context of the present invention the terms "adhesive", "adhesive binder" and "resin" designate a chemical composition which, in the wet stages of the manufacture of, e.g., particle and fiber boards, provides adhesion between the particles, fibers or flakes. After heat compression during board manufacture, the composition containing polymerized resin works as a binder which keeps the particles or fibers or flakes bonded together.

The term "wood-based product" denotes any lignocellulose-based products, such as particle boards, fiber boards (including high and medium density fiber boards, i.e. hard boards and MDF boards), flake boards, plywood and similar products constituted by particles, fibers or flakes of vegetable origin, in particular derived from wood or annular or perennial plants mixed with and bonded together with adhesive binders.

"Hydrolase" means an enzyme which breaks up (hydrolyzes) ester and glycosidic bonds appearing in the carbohydrate structure. In particular the hydrolase used for the purpose of the present invention affects the bonds between the monosaccharide units and/or between the side chains of the monosaccharide units and the monosaccharides. Thus, the enzyme preparation containing hydrolase activity preferably comprises cellulase, hemicellulase, amylase, pectinase or combinations thereof. Suitable cellulases are the cellobiohydrolases and the endoglucanases, suitable hemicellases are selected from xylanases and mannanases. The pectinase preparation can affect the galacturonic acid, rhamnose, xylose, fructose, arabinose and/or galactose components, xyloglucanes and/or arabinoglucane components of the cell walls of the plants. The hydrolytic enzyme preparation can contain mixtures of the above mentioned enzymes, in particular mixtures of cellulases and hemicellulases, but the preparation can also contain other enzymes in addition to the hydrolases.

Cellulase preparations typically contain one or several cellobiohydrolases (E.C. 3.2.1.91) and endoglucanases (E.C.3.2.1.4). Commercially they are produced by fungi belonging to the genera Trichoderma or Humicola. The pectinases comprise a large group of enzymes capable of degrading pectine substance of plant cell walls. The commercial pectinases contain, e.g., the following enzymes: pectine esterase (E.C. 3.1.1.11), polygalacturonase (E.C. 3.2.1.15), exopolygalacturonase (E.C. 3.2.1.67), pectinelyase (E.C. 4.2.2.2), endoglucanase (E.C. 3.2.1.4) and mannanase (E.C. 3.2.1.78). The hemicellulases are enzyme preparations which contain enzymes acting on xylans, mannans and pectine substances. Xylanases (E.C. 3.2.1.8) and mannanases (E.C.3.2.1.78) can be produced with many bacteria and fungi especially of the genera Trichoderma and Humicola.

For polymerizing lignin and carbohydrates of soluble wood fractions, oxidative enzymes capable of catalyzing oxidation of phenolic groups can be used. These enzymes are oxidoreductases, such as peroxidases and oxidases. "Peroxidases" are enzymes which catalyze oxidative reaction using hydrogen peroxide as their substrate, whereas "oxidases"are enzymes which catalyze oxidative reactions using molecular oxygen as their substrate. Phenoloxidases (E.C. 1.10.3.2 benzenediol:oxygen oxidoreductase) catalyze the oxidation of o- and p-substituted phenolic hydroxyl and amino/amine groups in monomeric and polymeric aromatic compounds. The oxidative reaction leads to the formation of phenoxy radicals and finally to the polymerization of lignin and possibly the carbohydrate matter. In the method of the present invention, the enzyme used may be any of the enzymes catalyzing the biological radical formation and secondary chemical polymerization of low molecular weight lignins, such as laccase, tyrosinase, peroxidase or oxidase.

As specific examples of oxidases the following can be mentioned: laccases (EC 1.10.3.2), catechol oxidases (EC 1.10.3.1), tyrosinases (EC 1.14.18.1) and bilirubin oxidases (EC 1.3.3.5). Laccases are particularly preferred oxidases. They can be obtained from bacteria and fungi belonging to, e.g., the following strains: Aspergillus, Neurospora, Podospora, Botrytis, Lentinus, Polyporus, Rhizoctonia, Coprinus, Coriolus, Phlebia, Pleurotus, Fusarium and Trametes.

Suitable peroxidases can be obtained from plants or fungi or bacteria. Preferred peroxidases are those which originate from plants, in particular horseradish peroxidase and soy bean peroxidase.

The terms "surfactant" or "surface active agent" are synonymously used to designate compounds which have affinity to water and to hydrophobic (e.g. fatty) materials, thus helping the hydrophobic materials to suspend in water.

Soluble Fraction Derivable from Wood Fibers

During industrial refining of wood by, e.g., refiner mechanical pulping (RMP), pressurized refiner mechanical pulping (PRMP), thermomechanical pulping (TMP), groundwood (GW) or pressurized groundwood (PGW) or chemithermomechanical pulping (CTMP), the wood raw material derived from different wood species is refined into fine fibres in processes which separate the individual fibers from each other.

During the processes, some (about 0.1 to 5%, typically about 0.5 to 2%) of the raw material is normally dissolved in the aqueous phase due to the prevailing conditions, such as the high temperature of the refining. These solubilized fractions are composed of the basic components of wood; cellulose, hemicellulose and lignin. The amounts depend on the wood species and the refining conditions used. Roughly, the process water of mechanical pulping of softwood chips contains some 40 to 70% carbohydrates, 10 to 25% lignin and 1 to 10% extractives. In contrast, hardwood pulping process water contains some 20 to 60% carbohydrates, 10 to 25% lignin and 10 to 40% extractives. The percentages are given by way of examples only and they have been calculated from the dry weight of the solid matter.

By treating the refined material with hydrolases in conjunction with (i.e. before, during or after) the refining it is possible to increase the absolute and relative amounts of solubilized carbohydrate, lignin and extractive compounds. The enzyme treatment is carried out at a temperature in the range of 20 to 80° C. at a pH in the range of 4 to 8 for 1 min to 72 hours, in particular 10 min to 24 hours. The activity of the enzyme used is some 10 to 5,000 nkat/g substrate.

The enzymatic treatment process according to the present invention can be carried out for any lignocellulosic raw material, such as saw dust, plant waste materials or industrial fibers.

In connection with the present invention it has turned out that the various components of the peeled fraction are all reactive towards oxidation in the presence of oxidase enzymes. As evidenced by the results of Example 3, the water soluble fractions obtained from spruce, pine and MDF-fibers treated with a hydrolytic enzyme, all can be enzymatically oxidized. Not wishing to be confined to any specific theory, it is suggested that there are formed various oxidized compounds containing, e.g., phenoxy radicals, which will provide adhesion to the lignocellulosic particles and fibers and which will take part in polymerization reactions.

Preparation of an Adhesive Binder Composition

According to the present invention, the separated carbohydrate/lignin fraction of the enzymatic treatment can be formulated into an adhesive binder by mixing it with an oxidase to provide oxidation and polymerization of the carbohydrates, lignin and extractives present. For this purpose, the soluble fractions are separated from the fibers and the aqueous phase is concentrated by filtration, ultrafiltration or evaporation or other suitable separation techniques. The dry matter content of the soluble fraction is usually less than 10 wt-%, often less than 5 wt-%. Consequently, it has to be concentrated to a much higher concentration before use. Typically, the dry matter content of the adhesive composition treated with enzymes, is about 20 to 80 wt-%. The soluble fraction used for the preparation of an adhesive binder comprises preferably about 10 to 70% carbohydrates and about 1–30% lignin calculated on basis of the dry weight of the water soluble fraction.

The enzyme used can be any of the enzymes prior known for catalyzing the oxidation and polymerization of aromatic compounds of lignins, such as laccase, tyrosinase, or other oxidases. The amount of the enzyme used varies depending on the activity of the enzyme and on the amount of dry matter content of the composition. Generally, the oxidases are used in amounts of 0.001 to 10 g protein/mg of dry matter, preferably about 0.1 to 5 mg protein/g of dry matter. The activity of the oxidase is about 1 to 100,000 nkat/mg, preferably over 100 nkat/g.

In connection with the present invention it has been found that oxygen plays a decisive role in the enzymatic polymerization of carbohydrates, extractives and lignin of any origin. This is important in particular for the production of adhesives for the manufacture of fiber boards, particle boards and flake boards and other similar wood-based products. Thus, in addition to the carbohydrate or lignin material, also oxygen is needed in sufficient amounts. The oxidative reaction leads to the formation of oxidized radicals (e.g. phenoxy radicals) and finally to the polymerization of the material.

In the known methods discussed above, crosslinking was only partially achieved because of apparent limitations on the availability of oxygen. The limitation of the reaction by oxygen manifests itself in the long reaction times used, and in the poor strength properties obtained, thus impairing the result of the enzyme-aided polymerization.

Oxygen supply can be increased by various means, such as efficient mixing, foaming, introducing air enriched with oxygen or oxygen supplied by enzymatic or chemical means to the solution. Although any oxygen-containing gas can be used, it is preferred to use air, oxygen enriched air, oxygen gas or pressurized systems of these.

Thus, according to an embodiment of the invention, the mixture comprising the soluble fraction and the enzyme is vigorously mixed in the presence of oxygen by e.g. aerating the mixture. The mixing time is usually about 1 min to 24 h, preferably about 5 min to 10 h.

According to an alternative embodiment, the supply of oxygen is achieved by producing a foam of the adhesive binder by mixing the soluble fraction lignin into water together to form a mixture and by bubbling a gas through the suspension to form bubbles having a medium diameter of 0.001 to 1 mm, in particular about 0.01 to 0.1 mm.

The foam is produced by using a surface active agent that can be anionic, cationic or nonionic. Thus, the surfactant can be selected from the group consisting of alkylsulfonate or alkyl benzene sulfonate, Tween® and other commercial polysorbate compounds, fatty acid soaps, lignosulfonates, sarcosinates, fatty acid amines or amines or poly(oxyetylene alcohol)s and wood and plant extractives. Foam stabilizers and solid surfactants, such as CMC, gelatin, pectin, wood extractive and similar compounds, can be used to produce and enhance the foam stability. A small amount of the surface active compounds is needed, i.e. about 0.01 to 10%, in particular about 0.05 to 5%.

The foam can be produced by foaming in a static foamer or in a turbulent foam cell by using known mixing technology.

In both of the above embodiments, the adhesive binders can be produced separately from the fibers and chips, which are mixed with the adhesive binder by extruding or spraying the foam to the fibers or chips. The adhesive binder can also be produced simultaneously by mixing the fibers or chips with the components of the adhesive binder composition. The adhesive binder composition is added either before of after drying of the fibers of the board after refining. The composition is added to the particles, fibers or flakes in an amount of 0.1 to 30%, preferably about 1 to 10% of the total dry weight.

According to a particularly preferred embodiment, lignin is admixed with the binder composition before the enzymatic oxidation. The amount of lignin can amount to 1 to 99% of the dry matter of the composition, preferably the composition contains 5 to 95% lignin and 95 to 5% soluble fraction (which already in itself contains some lignin). A part of the lignin can be added in the form of lignin-containing fibers.

As the results of the Examples below show, particle boards and MDF boards manufactured from adhesive binder compositions containing 10% of the soluble fraction, 90% isolated kraft lignin and an oxidase (laccase) provides boards having equal strength properties compared to boards prepared by conventional technology employing UF resins. By substituting 1 to 50% of the isolated lignin with the soluble carbohydrate/lignin fraction described herein, it is possible significantly to reduce the costs of the natural resin binder.

The following non-limiting examples will elucidate the invention.

EXAMPLE 1

Hydrolysis and Separation of Soluble Fractions from Different Raw Materials and Using Different Enzymes The fibers from various mechanical refining processes and wood species were treated with different enzymes, capable of hydrolyzing wood carbohydrates. The enzyme amounts used were chosen according to their different active components. The enzymes included activities of cellulases, hemicellulases (xylanases and mannanases) and pectinases. The major activities measured and used per gram of fibers are summarized in Table 1. After the enzymatic treatment the solubilized fractions were separated from the fibers.

TABLE 1

Enzyme activities of enzymes used (nanokatals per gram of fiber)

| Enzyme preparation (with major activity) | Cellulase | Xylanase | Mannanase | Pectinase |
|---|---|---|---|---|
| 1. Enzyme 1 | 18 | 1000 | 3 | 6 |
| 2. Enzyme 2 | 138 | 173 | 1000 | 14 |
| 3. Enzyme 3 | 12 | 17 | 157 | 1000 |
| 4. Enzyme 4 | 19 | 29 | 138 | 1000 |

EXAMPLE 2

Composition of the Soluble Fractions

The composition of the solubilized fractions from different wood species were analyzed. The results are presented in Table 2.

TABLE 2

Composition of solubilized fractions from different wood species

| | | | Composition of solubilized fraction, % | | |
|---|---|---|---|---|---|
| Wood material | Enzyme | Yield % of saw dust | Reducing compounds % | Total carbo-hydrates | Lignin |
| SPRUCE | Enzyme 1 | 1.0 | 30 | 30 | 22 |
| | Enzyme 2 | 1.3 | 17 | 31 | 25 |
| | Enzyme 3 | 1.9 | 21 | 16 | 15 |
| | Enzyme 4 | 1.4 | 36 | 43 | 19 |
| PINE | Enzyme 1 | 1.45 | 34 | 79 | 6.2 |
| | Enzyme 2 | 1.57 | 48 | 91 | 7.6 |
| | Enzyme 3 | 2.47 | 32 | 51 | 4.5 |
| | Enzyme 4 | 2.08 | 48 | 63 | 4.8 |
| MDF | Enzyme 1 | 3.5 | | | 0.7 |
| | Enzyme 2 | 3.3 | | | 0.8 |

EXAMPLE 3

Reactivities of the Soluble Fractions Towards Enzymatic Polymerization

The reactivities of the solubilized fractions towards enzymatic oxidation were analyzed as the specific oxygen consumption (mg of $O_2$ consumed per g of substrate). The results are compared with the respective numbers for the known wood based glue materials, kraft lignin and lignosulphonate. The results are presented in Table 3.

TABLE 3

Reactivities of the solubilized fractions and some industrial lignins

| Wood material | Enzyme | Consumption $O_2$ mg/g by solubilized fraction |
|---|---|---|
| SPRUCE | Enzyme 1 | 12.6 |
| | Enzyme 2 | 13.7 |
| | Enzyme 3 | 6.7 |
| | Enzyme 4 | 8.1 |
| PINE | Enzyme 1 | 3.7 |
| | Enzyme 2 | 2.9 |
| | Enzyme 3 | 2.1 |
| | Enzyme 4 | 2.2 |

TABLE 3-continued

Reactivities of the solubilized fractions and some industrial lignins

| Wood material | Enzyme | Consumption $O_2$ mg/g by solubilized fraction |
|---|---|---|
| MDF | Enzyme 1 | 7.3 |
| | Enzyme 2 | 7.9 |
| ligno-sulphonate | 4/3 | |
| Kraft lignin | | 2.5 |

As can be seen from the results, the reactivities are high as compared with industrial lignins.

EXAMPLE 4

Glueing of Particle Board Test Panels with the Soluble Fraction

Soluble fractions produced as described in Example 1 were used as binders in particle board test panel glueing.

4.0 g of the lignin fraction was vigorously mixed and aerated for 30 min with 4.0 g of laccase concentrate (activity 4000 nkat/g) in 2.0 g of 2 M sodium acetate buffer (pH 4.5). 1.4 g of the mixture was then sprayed onto or mechanically mixed with 4.4 g of particle board chips. The chips had already been treated with 0.7% of wax (Mobilex 54, 60% emulsion in water) of the dry weight of the fibers. The reference tests were performed with kraft lignin and commercial ureaformaldehyde resins.

For strength tests particle board panels of the size of 50 mm×50 mm×2 mm (weight about 5 g) were prepared by pressing 2 min at a pressure of 30 kp/cm$^2$ and a temperature of 190 ° C. After pressing the panels were cut into four pieces (50 mm×12 mm×2 mm). These pieces were tested for parallel tensile strength with Zwick tensile strength testing equipment.

TABLE 4

Results of small scale glueing tests for particle board chips

| Glue-material | Lignin content % of dw | Tensile strength MPa |
|---|---|---|
| MDF xylanase extract | 20 | 9.6 |
| MDF mannanase extract | 24 | 9.7 |
| Spruce xylanase extract | 22 | 7.4 |
| Spruce mannanase extract | 25 | 7.3 |
| Pine xylanase extract | 6.2 | 6.0 |
| Pine mannanase extract | 7.6 | 7.9 |
| Water | | 3.0 |
| UF resin | | 12.5 |

Although no direct correlation between the tensile strength values and lignin content in different cases could be found, most soluble fractions show very promising strength properties when compared with respective lignin contents in the soluble fractions.

EXAMPLE 5

Glueing of MDF Fibres with the Soluble Fraction in the Enzyme Catalyzed Glueing Reaction In an analogous way to Example 4, MDF fibers were mixed with a soluble fraction and an MDF board was manufactured by enzymatically catalyzing the binding reaction of the adhesive binder.

What is claimed is:

1. An adhesive binder for bonding together wood-based products, comprising a phenoloxidase enzyme and a solubilized faction obtained by treatment of fibrous, lignocellulosic raw materials with a hydrolytic enzyme.

2. The adhesive binder according to claim 1, comprising a water-soluble fraction obtained by treatment of fibrous, lignocellulosic raw material with hydrolytic enzymes in an aqueous medium.

3. The adhesive binder according to claim 1, comprising an aqueous mixture containing 1–30% lignin, 5–95% carbohydrates and 1–30% extractives, based on the weight of the dry matter of the mixture.

4. The adhesive binder according to claim 1, wherein the solubilized fraction is oxidized and polymerized.

5. The adhesive binder according to claim 1, comprising the solubilized fraction contained in an aqueous medium and having a dry weight concentration of 10 to 90% by weight.

6. A process for preparing an adhesive binder composition, which comprises the steps of treating lignocellulosic raw material with a hydrolytic enzyme in an aqueous medium, recovering the solubilized material of the enzymatic treatment, forming an aqueous suspension containing said material and a phenoloxidase, and oxidizing said material in the presence of said phenoloxidase by introducing oxygen-containing gas into the suspension.

7. The process according to claim 6, comprising mixing lignocellulosic particles, fibers and flakes of vegetable origin with the solubilized material and the phenoloxidase to form a hardenable composition, shaping said composition into particle boards, fiber boards, flake boards or wood-based products by oxidizing, and polymerizing the solubilized material in the presence of said oxidase and oxygen.

8. The process according to claim 7, wherein oxygen is introduced into the mixture of the solubilized material, the phenoloxidase and the lignocellulosic particles, fibers or flakes in the form of an oxygen-containing gas.

9. The process according to claim 8, wherein the oxygen-containing gas comprises air, oxygen enriched air, oxygen gas or mixtures thereof.

10. The process according to claim 8, wherein oxygen is introduced by aerating the mixture or forming a foam of the mixture.

11. The process according to claim 10, wherein the suspension is foamed to 1.2 to 10 times of its original volume.

12. The process according to any one of claim 9, wherein the hydrolytic enzyme is selected from the group consisting of cellulases, hemicellulases and pectinases.

13. The process according to claim 12, wherein the hydrolytic enzyme is selected from the group consisting of xylanases, mannanases and pectinases.

14. The process according to claim 7, wherein the phenoloxidase is laccase or a peroxidase.

15. The process according to claim 7, wherein the soluble fraction is obtained from enzymatic treatment of refiner mechanical pulp, pressurized refiner mechanical pulp, thermomechanical pulp, groundwood or pressurized groundwood, or chemithermomechanical pulp.

16. A process for the preparation of wood-based products, comprising the steps of bonding particles, fibers or flakes of vegetable origin together with an enzymatically oxidized and polymerized water-soluble fraction containing carbohydrates and lignin and obtained by enzymatic peeling of fibrous, lignocellulosic raw materials with a hydrolytic enzyme, said enzymatical oxidation and polymerization being carried out with a phenoloxidase.

17. The process according to claim 16, wherein the fraction is added to the particles, fibers or flakes in an amount of 1 to 10% of the total dry weight.

18. A wood-based product, comprising lignocellulosic particles, fibers or flakes of vegetable origin mixed with and bonded together, in the presence of a phenoloxidase, with an oxidized and polymerized water-soluble carbohydrate/lignin fraction obtained by enzymatic peeling of fibrous, lignocellulosic raw material with a hydrolytic enzyme.

19. The wood-based product according to claim 18, which contains, in addition to the water soluble fraction, oxidized lignin as a binder.

20. The adhesive binder according to claim 1, comprising the solubilized fraction contained in an aqueous medium and having a dry weight concentration of 20–80% by weight.

21. The wood-based product according to claim 18, which is a particle baord, fiber board or flake board.

* * * * *